(12) United States Patent
Nishida (10) Patent No.: US 11,496,644 B2
(45) Date of Patent: Nov. 8, 2022

(54) IMAGE PROCESSING SYSTEM AND NON-TRANSITORY COMPUTER-READABLE RECORDING MEDIUM HAVING STORED THEREON IMAGE PROCESSING PROGRAM

(71) Applicant: KYOCERA Document Solutions Inc., Osaka (JP)

(72) Inventor: Atsushi Nishida, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 120 days.

(21) Appl. No.: 17/172,253

(22) Filed: Feb. 10, 2021

(65) Prior Publication Data
US 2021/0258447 A1 Aug. 19, 2021

(30) Foreign Application Priority Data
Feb. 13, 2020 (JP) .............................. JP2020-022093

(51) Int. Cl.
*H04N 1/38* (2006.01)
*G06T 3/40* (2006.01)
(Continued)

(52) U.S. Cl.
CPC ............ *H04N 1/38* (2013.01); *G06K 9/6217* (2013.01); *G06T 3/40* (2013.01); *G06T 7/11* (2017.01); *G06V 30/413* (2022.01); *H04N 1/00005* (2013.01); *H04N 1/00037* (2013.01); *H04N 1/00039* (2013.01); *H04N 1/40093* (2013.01); *G06T 2207/20021* (2013.01);
(Continued)

(58) Field of Classification Search
CPC .. H04N 1/38; H04N 1/00005; H04N 1/00037; H04N 1/00039; H04N 1/40093; H04N 2201/0094; H04N 1/64; G06K 9/6217; G06T 3/40; G06T 7/11; G06T 2207/20021; G06T 2207/20084; G06T 2207/30176; G06T 2207/10008; G06V 30/413; G06V 10/44; G06V 30/19173; G06V 30/226; G06N 3/0454; G06N 3/084
See application file for complete search history.

(56) References Cited

U.S. PATENT DOCUMENTS

2003/0202697 A1* 10/2003 Simard .................. H04N 1/403
382/195

FOREIGN PATENT DOCUMENTS

JP 2005-276188 10/2005
JP 2019-057779 4/2019

* cited by examiner

*Primary Examiner* — Christopher Wait
(74) *Attorney, Agent, or Firm* — Lex IP Meister, PLLC (57) ABSTRACT

A CNN of an image forming apparatus includes: an encoder which compresses, for each tile image obtained by dividing an image into specific size pieces, information of the tile image; a decoder which restores the information of the tile image compressed by the encoder; and a blank sheet determination portion which determines whether the tile image corresponds to a blank sheet image. A segmentation image generation portion uses, when the blank sheet determination portion determines the tile image as being the blank sheet image, the blank sheet image for an image of a part corresponding to the tile image in a segmentation image, and uses, when the blank sheet determination portion determines the tile image as not being the blank sheet image, an output image of the decoder for an image of a part corresponding to the tile image in the segmentation image.

4 Claims, 9 Drawing Sheets

(51) Int. Cl.
*G06T 7/11* (2017.01)
*H04N 1/00* (2006.01)
*G06K 9/62* (2022.01)
*H04N 1/40* (2006.01)
*G06V 30/413* (2022.01)

(52) U.S. Cl.
CPC ............... *G06T 2207/20084* (2013.01); *G06T 2207/30176* (2013.01); *H04N 2201/0094* (2013.01)

FIG. 9

IMAGE PROCESSING SYSTEM AND NON-TRANSITORY COMPUTER-READABLE RECORDING MEDIUM HAVING STORED THEREON IMAGE PROCESSING PROGRAM

INCORPORATION BY REFERENCE

This application is based upon, and claims the benefit of priority from, corresponding Japanese Patent Application No. 2020-022093 filed in the Japan Patent Office on Feb. 13, 2020, the entire contents of which are incorporated herein by reference.

BACKGROUND

Field of the Invention

The present disclosure relates to an image processing system which detects a handwritten part from an image, and a non-transitory computer-readable recording medium having stored thereon an image processing program.

Description of Related Art

Typically, an image processing system which detects a handwritten part from an image and then generates an image created by removing the detected handwritten part is known.

SUMMARY

An image processing system of the present disclosure comprises a convolutional neural network which determines, for each pixel of an image, a probability that the image represents handwriting and a segmentation image generation portion which generates a segmentation image on the basis of a result of determination by the convolutional neural network. The convolutional neural network comprises an encoder which compresses information of the tile image for each tile image obtained by dividing the image into specific size pieces; a decoder which restores the information of the tile image which has been compressed by the encoder; and a specific image determination portion which determines whether the tile image corresponds to a specific image. When the specific image determination portion determines that the tile image corresponds to the specific image, the segmentation image generation portion uses the specific image for an image of a part corresponding to the tile image in the segmentation image, and when the specific image determination portion determines that the tile image does not correspond to the specific image, the segmentation image generation portion uses an output image of the decoder of a part corresponding to the tile image in the segmentation image.

A non-transitory computer-readable recording medium of the present disclosure stores an image processing program, and the image processing program causes a computer to implement a convolutional neural network which determines, for each pixel of an image, a probability that the image represents handwriting and a segmentation image generation portion which generates a segmentation image on the basis of a result of determination by the convolutional neural network. The convolutional neural network comprises an encoder which compresses information of the tile image for each tile image obtained by dividing the image into specific size pieces; a decoder which restores the information of the tile image which has been compressed by the encoder; and a specific image determination portion which determines whether the tile image corresponds to a specific image. When the specific image determination portion determines that the tile image corresponds to the specific image, the segmentation image generation portion uses the specific image for an image of a part corresponding to the tile image in the segmentation image, and when the specific image determination portion determines that the tile image does not correspond to the specific image, the segmentation image generation portion uses an output image of the decoder for an image of a part corresponding to the tile image in the segmentation image.

DETAILED DESCRIPTION

In the following, embodiments of the present disclosure will be described with reference to the accompanying drawings.

First, a configuration of an image forming apparatus as an image processing system according to one embodiment of the present disclosure will be described.

Figure 1:
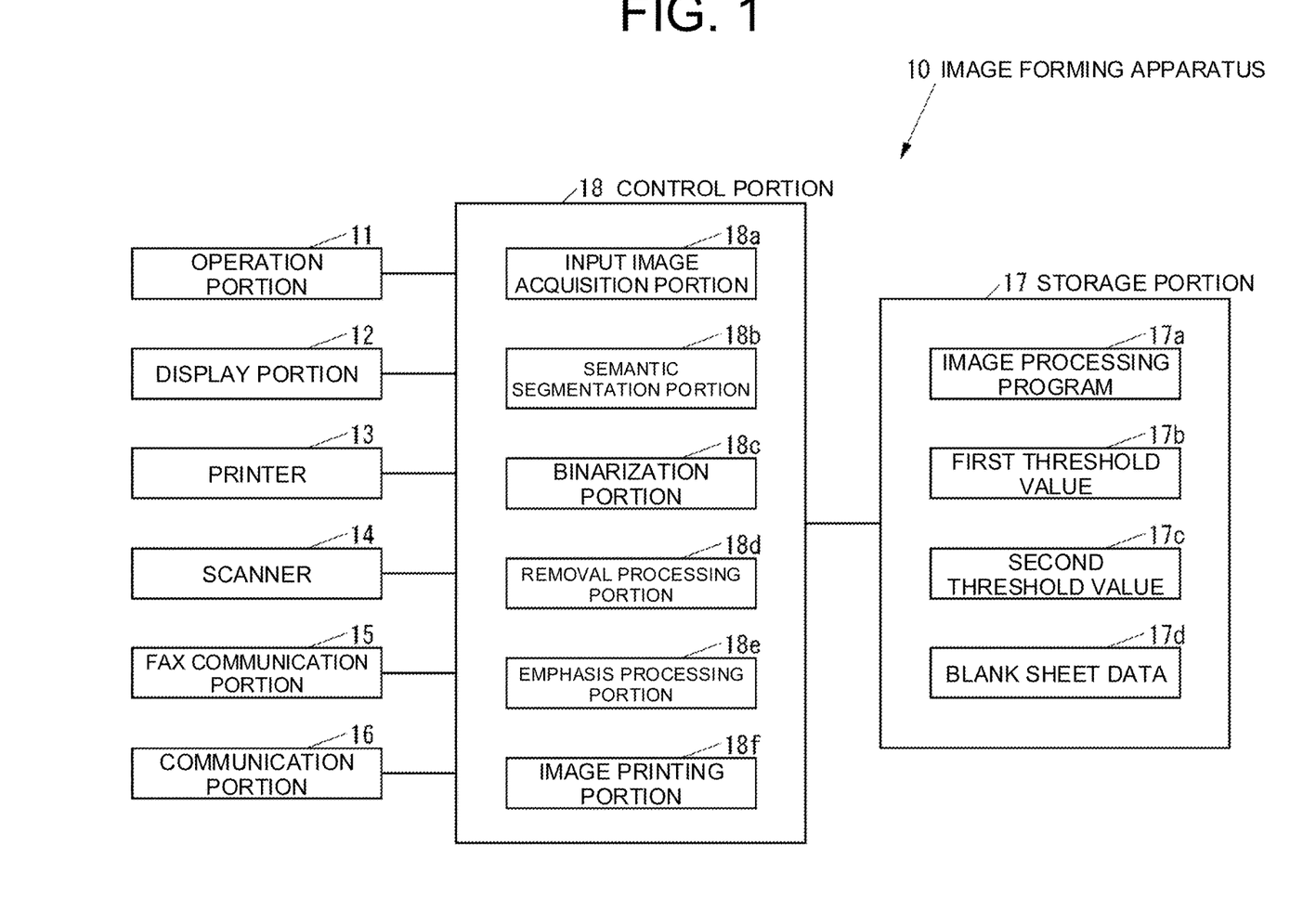
FIG. 1 is a block diagram of an image forming apparatus according to one embodiment of the present disclosure.

FIG. 1 is a block diagram of an image forming apparatus 10 according to the present embodiment.

As illustrated in FIG. 1, the image forming apparatus 10 is a multifunction peripheral (MFP) which comprises: an operation portion 11, which is an operation device such as a button by which various operations are input; a display portion 12, which is a display device such as a liquid crystal display (LCD) that displays various kinds of information; a printer 13, which is a print device that prints an image on a recording medium such as paper; a scanner 14, which is a reading device that reads an image from a document; a fax communication portion 15, which is a fax device that performs fax communication with an external facsimile machine (not shown) via a communication line such as a public telephone line; a communication portion 16, which is a communication device that communicates with an external device via a network such as a local area network (LAN) and the Internet, or communicates with the external device directly by wire or wirelessly not by way of the network; a storage portion 17, which is a nonvolatile storage device such as a semiconductor memory or a hard disk drive (HDD) storing various kinds of information; and a control portion 18 which controls the image forming apparatus 10 as a whole.

The storage portion 17 stores an image processing program 17a for processing an image. The image processing program 17a may be installed on the image forming apparatus 10 at the stage of manufacturing the image forming apparatus 10, for example, or may be additionally installed on the image forming apparatus 10 from an external storage medium such as a universal serial bus (USB) flash drive, or from the network.

The storage portion 17 stores a first threshold value 17b, which is a threshold value for removal processing for removing a handwritten part, and a second threshold value 17c, which is a threshold value for emphasis processing for emphasizing the handwritten part. The second threshold value 17c is smaller than the first threshold value 17b.

The storage portion 17 stores blank sheet data 17d, which is data of an image of a blank sheet of paper assumed as a specific image. In an image represented by the blank sheet data 17d, a probability that the image represents handwriting (hereinafter referred to as a "handwriting probability") is 0 for all pixels.

The control portion 18 includes, for example, a central processing unit (CPU), a read-only memory (ROM) which stores a program and various kinds of data, and a Random Access Memory (RAM) as a memory used as a work area for the CPU of the control portion 18. The CPU of the control portion 18 executes the program stored in the storage portion 17 or in the ROM of the control portion 18. That is, the image forming apparatus 10 is a computer.

As the control portion 18 executes the image processing program 17a, the control portion 18 realizes an input image acquisition portion 18a which acquires an image of a document (hereinafter referred to as an "input image") by reading the document by the scanner 14; a semantic segmentation portion 18b which generates a segmentation image from the input image; a binarization portion 18c which binarizes the segmentation image according to whether each part of the segmentation image corresponds to a handwritten part or not; a removal processing portion 18d which generates an output image in which the handwritten part is removed from the input image; an emphasis processing portion 18e which generates an output image in which the handwritten part is emphasized over the input image; and an image printing portion 18f which prints the output image by the printer 13.

Next, the operation of the image forming apparatus 10 will be described.

First, the operation of the image forming apparatus 10 when processing of printing an image, which is the image obtained by removing a handwritten part from an image of a document, is instructed to be executed will be described.

Figure 2:
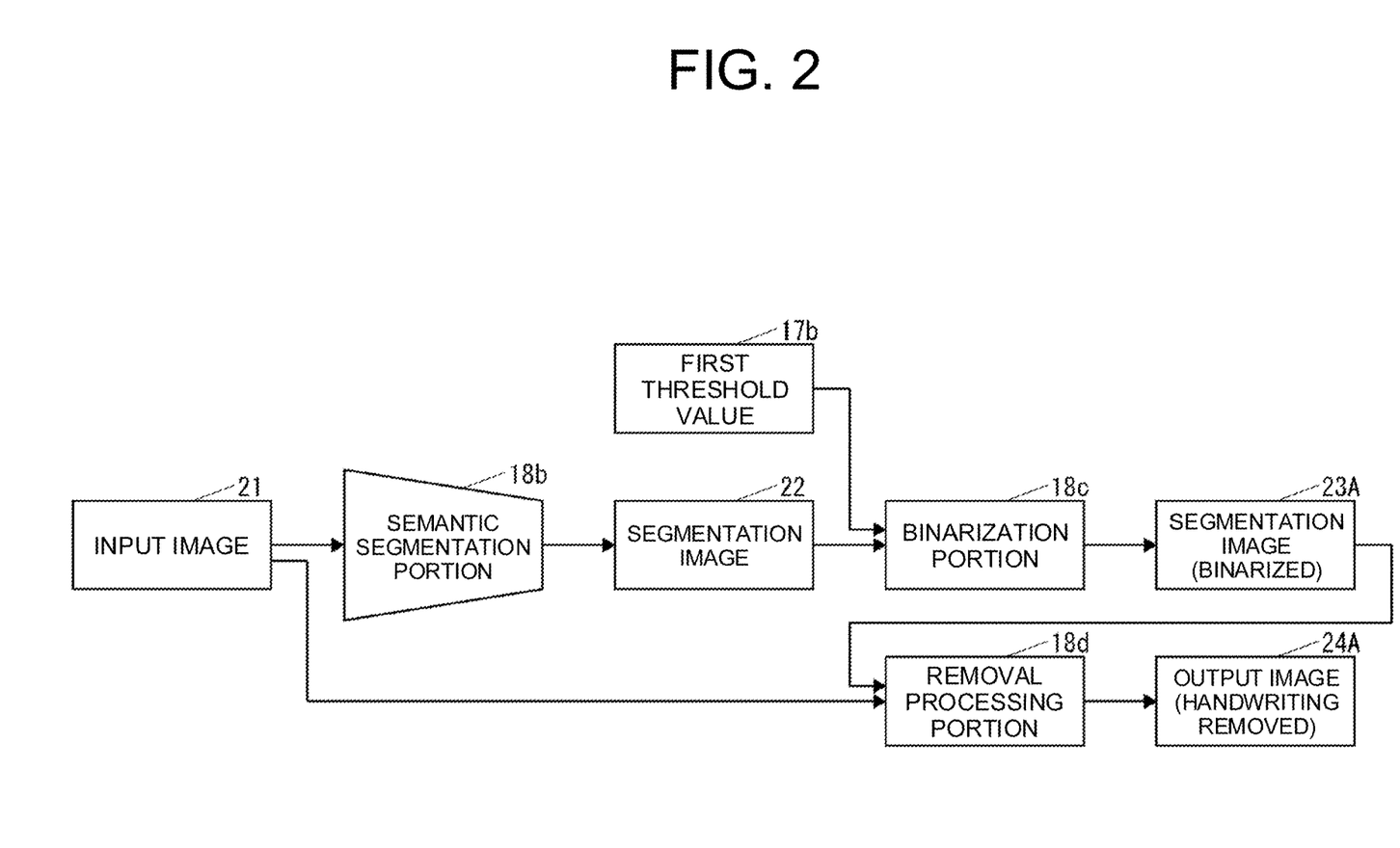
FIG. 2 is a diagram illustrating a flow of an operation of the image forming apparatus shown in FIG. 1 in a case where processing of printing an image in which a handwritten part is removed from an image of a document is instructed to be executed.

FIG. 2 is a diagram illustrating a flow of an operation of the image forming apparatus 10 in a case where processing of printing an image in which a handwritten part is removed from an image of a document is instructed to be executed.

A user can set a document on the scanner 14, and then instruct, via the operation portion 11, execution of processing of printing an image in which a handwritten part is removed from an image of the document.

When the execution of the processing of printing the image in which the handwritten part is removed from the image of the document is instructed, the input image acquisition portion 18a acquires an input image 21 by reading the document by means of the scanner 14, as illustrated in FIG. 2.

Next, the semantic segmentation portion 18b generates a segmentation image 22 from the input image 21. Note that the semantic segmentation portion 18b determines the handwriting probability for each pixel of the input image 21, and assigns the determined handwriting probability to each pixel of the segmentation image 22.

Next, the binarization portion 18c generates a binarized segmentation image 23A by binarizing the segmentation image 22 by the first threshold value 17b. That is, the binarization portion 18c assumes, among the pixels of the segmentation image 22, a pixel whose handwriting probability is greater than or equal to the first threshold value 17b as a pixel of the handwritten part, and a pixel whose handwriting probability is less than the first threshold value 17b as a pixel of a part other than the handwritten part.

Next, the removal processing portion 18d generates an output image 24A in which the handwritten part of the binarized segmentation image 23A is removed from the input image 21.

Finally, the image printing portion 18f prints the output image 24A by the printer 13.

As described above, the image forming apparatus 10 prints the image in which the handwritten part is removed from the image of the document.

Next, the operation of the image forming apparatus 10 when processing of printing an image, which is the image obtained by emphasizing a handwritten part over an image of a document, is instructed to be executed will be described.

Figure 3:
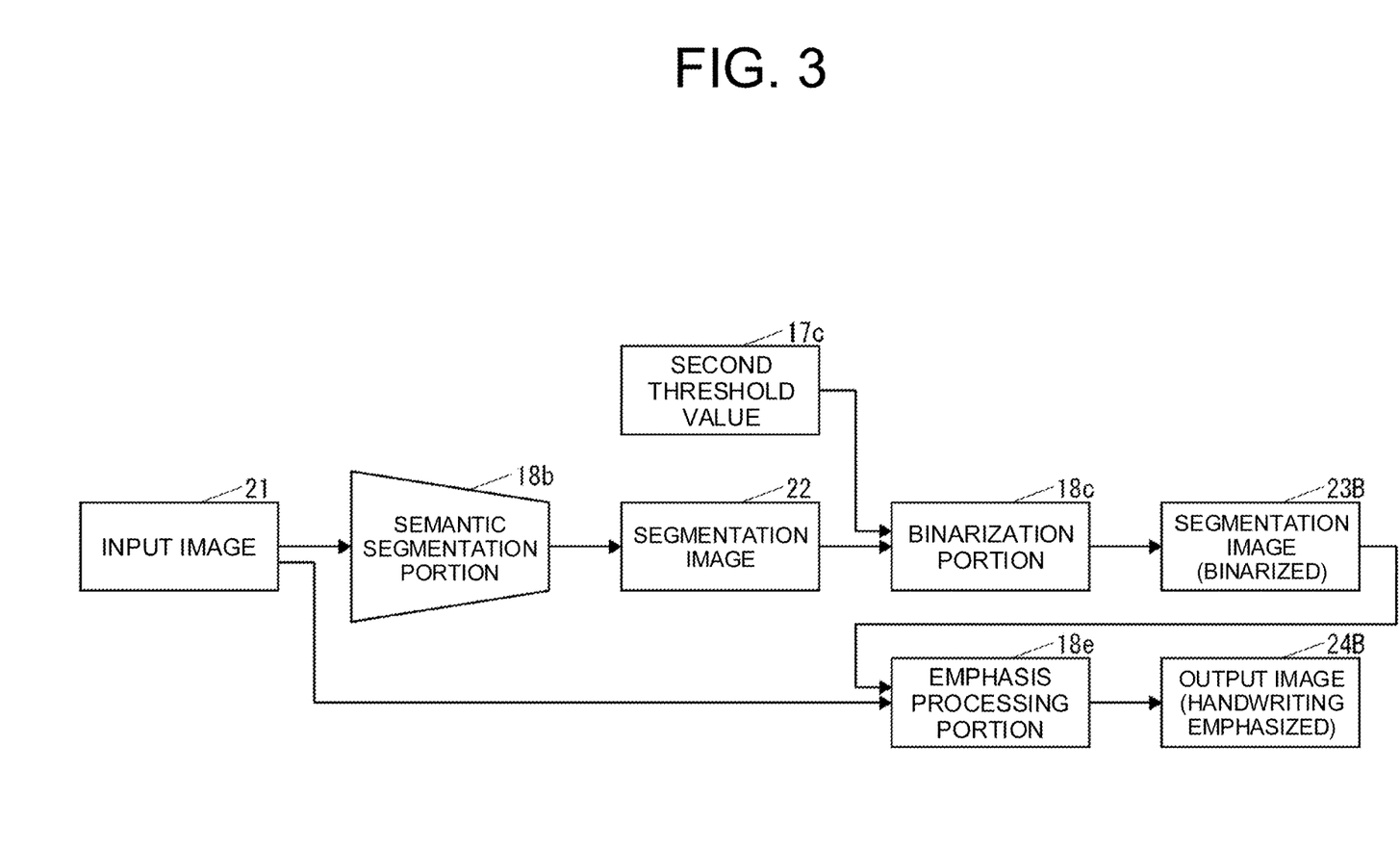
FIG. 3 is a diagram illustrating a flow of an operation of the image forming apparatus shown in FIG. 1 in a case where processing of printing an image in which a handwritten part is emphasized over an image of a document is instructed to be executed.

FIG. 3 is a diagram illustrating a flow of an operation of the image forming apparatus 10 in a case where processing of printing an image in which a handwritten part is emphasized over an image of a document is instructed to be executed.

A user can set a document on the scanner 14, and then instruct, via the operation portion 11, execution of processing of printing an image in which a handwritten part is emphasized over an image of the document.

When the execution of the processing of printing the image in which the handwritten part is emphasized over the image of the document is instructed, the input image acquisition portion 18a acquires the input image 21 by reading the document by means of the scanner 14, as illustrated in FIG. 3.

Next, the semantic segmentation portion 18b generates the segmentation image 22 from the input image 21. Note that the semantic segmentation portion 18b determines the handwriting probability for each pixel of the input image 21, and assigns the determined handwriting probability to each pixel of the segmentation image 22.

Next, the binarization portion 18c generates a binarized segmentation image 23B by binarizing the segmentation image 22 by the second threshold value 17c. That is, the binarization portion 18c assumes, among the pixels of the segmentation image 22, a pixel whose handwriting probability is greater than or equal to the second threshold value 17c as a pixel of the handwritten part, and a pixel whose handwriting probability is less than the second threshold value 17c as a pixel of a part other than the handwritten part.

Next, the emphasis processing portion 18e generates an output image 24B in which the handwritten part of the binarized segmentation image 23B is emphasized over the input image 21.

Finally, the image printing portion 18f prints the output image 24B by the printer 13.

As described above, the image forming apparatus 10 prints the image in which the handwritten part is emphasized over the image of the document.

Figure 4A:
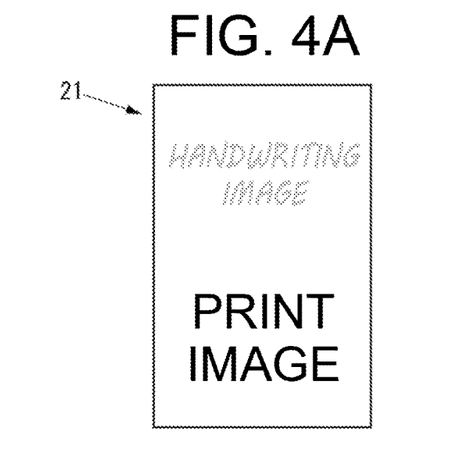
FIG. 4A is an illustration showing an example of an input image shown in FIG. 2 or FIG. 3.
Figure 4B:
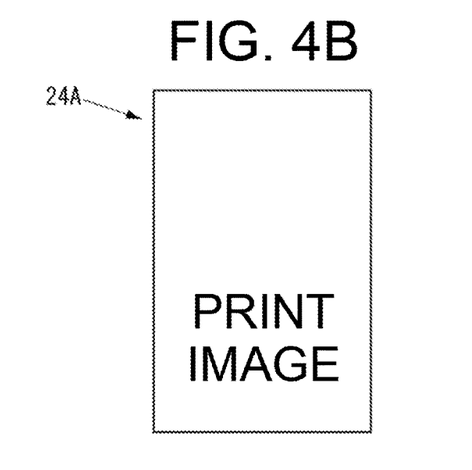
FIG. 4B is an illustration showing an example of an output image shown in FIG. 2.
Figure 4C:
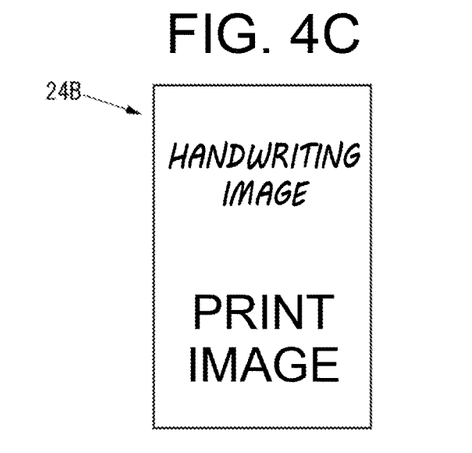
FIG. 4C is an illustration showing an example of an output image shown in FIG. 3.

FIG. 4A is an illustration showing an example of the input image 21 shown in FIG. 2 or FIG. 3. FIG. 4B is an illustration showing an example of the output image 24A shown in FIG. 2. FIG. 4C is an illustration showing an example of the output image 24B shown in FIG. 3.

By the operation illustrated in FIG. 2, the image forming apparatus 10 can print the output image 24A as shown in FIG. 4B, which is the image in which the handwritten part is removed from the input image 21 shown in FIG. 4A.

By the operation illustrated in FIG. 3, the image forming apparatus 10 can print the output image 24B as shown in FIG. 4C, which is the image in which the handwritten part is emphasized over the input image 21 shown in FIG. 4A.

Next, the operation of the semantic segmentation portion 18b will be described in detail.

Figure 5:
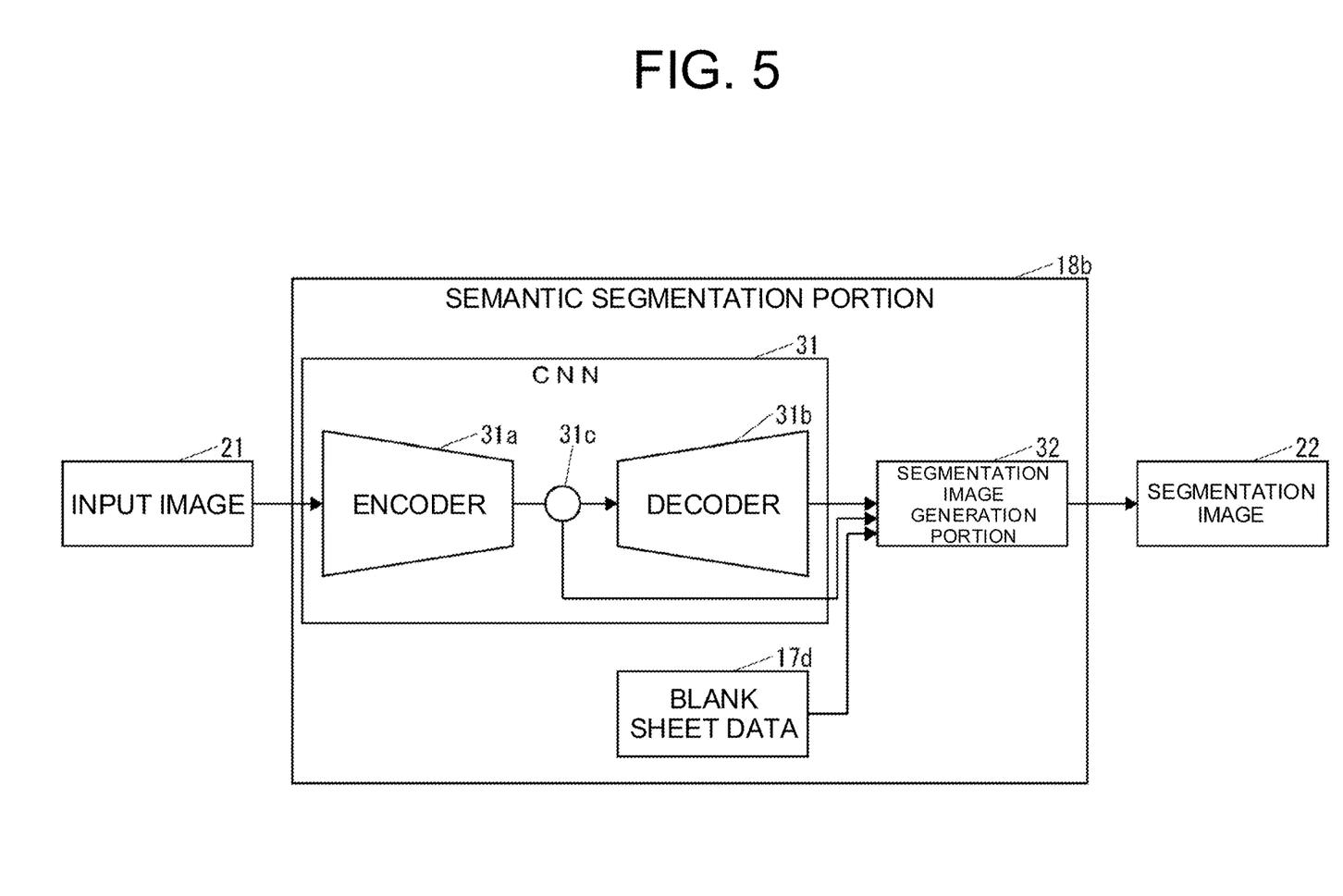
FIG. 5 is a diagram illustrating a flow of an operation of a semantic segmentation portion shown in FIG. 2 or FIG. 3.

FIG. 5 is a diagram illustrating a flow of an operation of the semantic segmentation portion 18b.

As illustrated in FIG. 5, the semantic segmentation portion 18b includes a convolutional neural network (CNN) 31 which determines the handwriting probability for each pixel of the input image 21, and a segmentation image generation portion 32 which generates the segmentation image 22 on the basis of a result of determination by the CNN 31.

When the CNN 31 is to execute processing for a large image at one time, the RAM usage size increases extremely. Accordingly, in order to reduce the RAM usage size, the CNN 31 executes the processing for each image in units of tiles of a specific small size (hereinafter referred to as a "tile image") with respect to the input image 21. The CNN 31 comprises an encoder 31a which compresses information of the image; a decoder 31b which restores the information of the image that has been compressed by the encoder 31a; and a blank sheet determination portion 31c which serves as a specific image determination portion for determining whether the tile image corresponds to the image of a blank sheet of paper, in other words, the specific image, on the basis of an output of the encoder 31a.

When the blank sheet determination portion 31c determines that the tile image corresponds to the image of the blank sheet of paper, the blank sheet determination portion 31c notifies the segmentation image generation portion 32 of a pointer to the blank sheet data 17d without inputting the output of the encoder 31a to the decoder 31b. In contrast, when the blank sheet determination portion 31c determines that the tile image does not correspond to the image of the blank sheet of paper, the blank sheet determination portion 31c inputs the output of the encoder 31a to the decoder 31b.

When the segmentation image generation portion 32 is notified of the pointer to the blank sheet data 17d from the blank sheet determination portion 31c with respect to the tile image, the segmentation image generation portion 32 uses the image indicated by the blank sheet data 17d as the image of the part corresponding to this tile image in the segmentation image 22. Meanwhile, when the segmentation image generation portion 32 receives an output image of the decoder 31b with respect to the tile image, the segmentation image generation portion 32 uses the output image of the decoder 31b as the image of the part corresponding to this tile image in the segmentation image 22.

Figure 6:
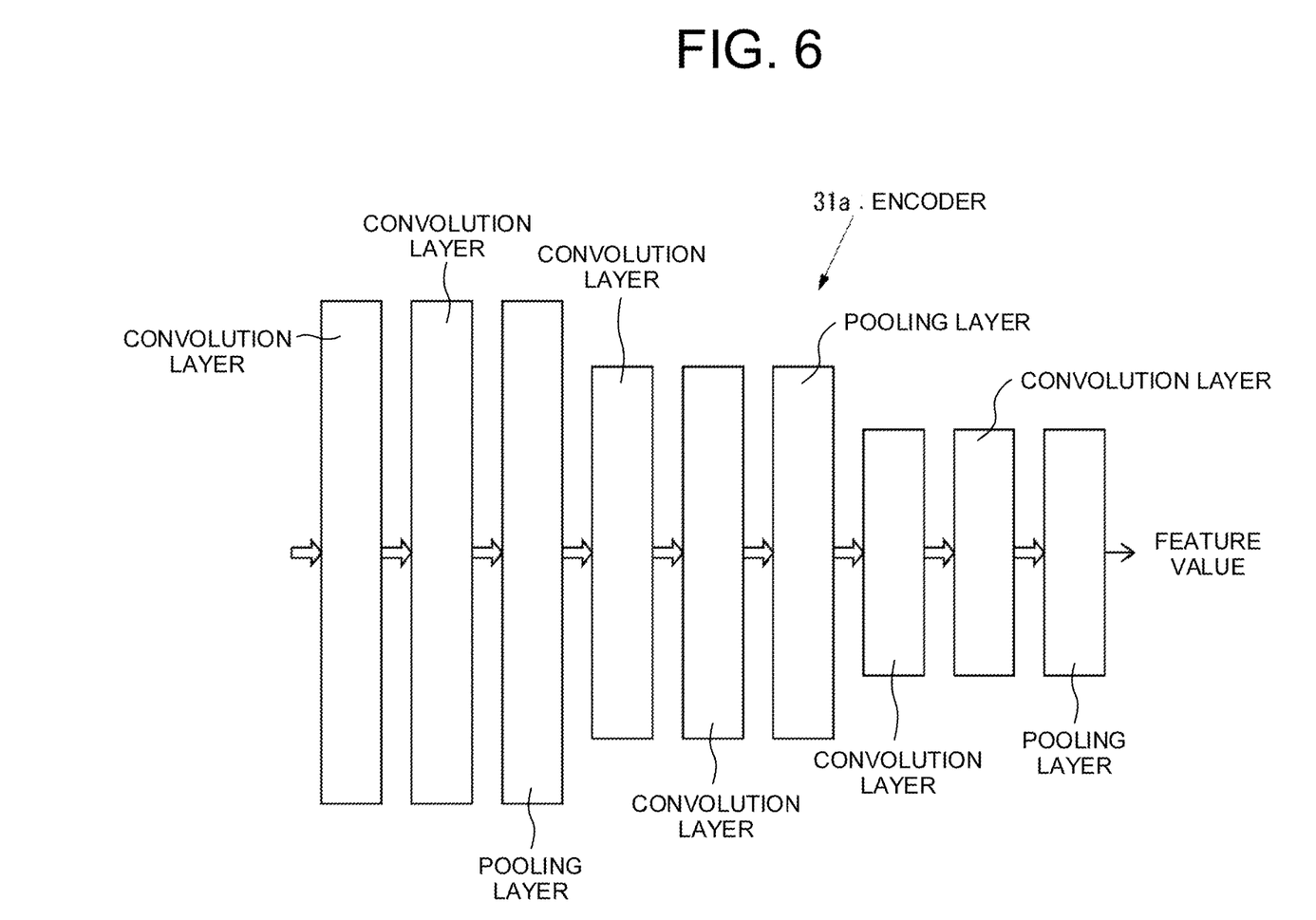
FIG. 6 is a diagram illustrating a flow of an operation of an encoder shown in FIG. 5.

FIG. 6 is a diagram illustrating a flow of an operation of the encoder 31a.

As illustrated in FIG. 6, the encoder 31a includes a convolution layer and a pooling layer. The convolution layer is a layer in which a convolution operation is executed. The pooling layer is a layer in which pooling processing is executed.

Figure 7:
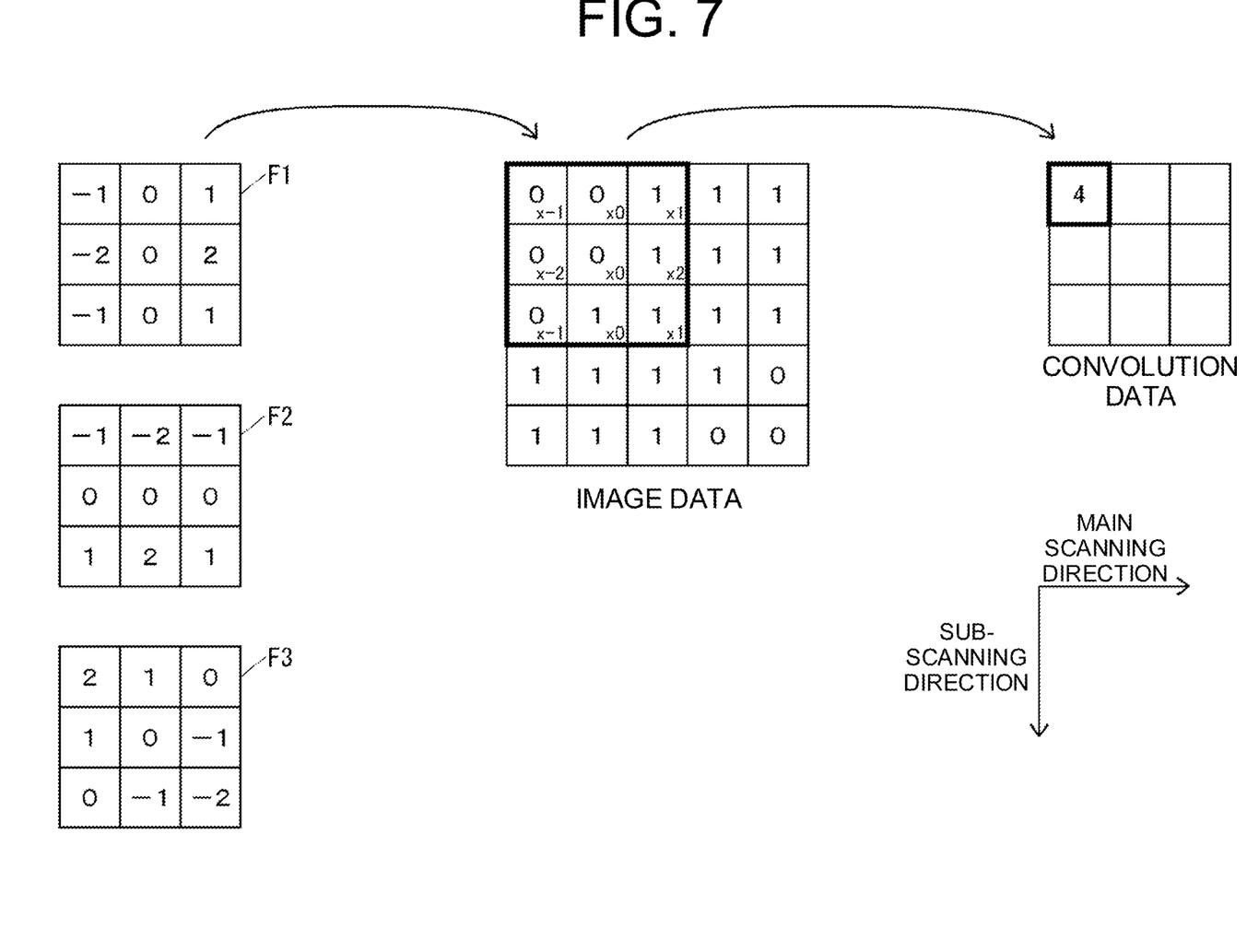
FIG. 7 is a diagram illustrating an example of a convolution operation performed by a convolution layer shown in FIG. 6.

FIG. 7 is a diagram illustrating an example of the convolution operation performed by the convolution layer shown in FIG. 6.

As illustrated in FIG. 7, the convolution layer uses a plurality of filters such as differential filters F1 to F3 for performing convolution at every position of each piece of RGB data of the image data to extract edges. By doing so, the convolution layer can generate convolution data which represents a feature map including edge information.

The weight of the differential filter can be adjusted or determined by learning. By using images of the handwriting and print images not of the handwriting as teacher (training) data in the learning, it is possible to realize supervised machine learning by, for example, an error backpropagation method.

Figure 8:
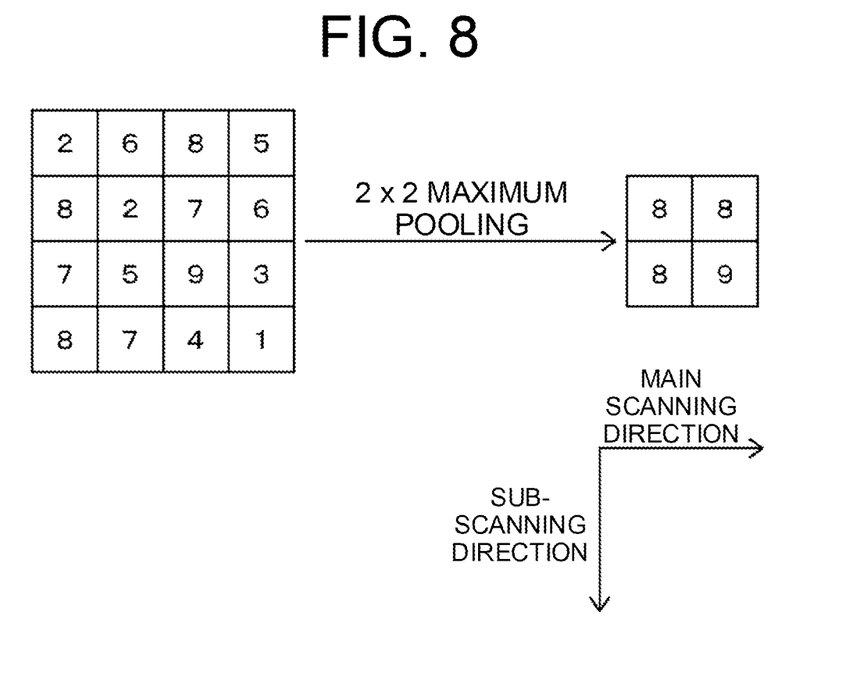
FIG. 8 is a diagram illustrating an example of pooling processing performed by a pooling layer shown in FIG. 6.

FIG. 8 is a diagram illustrating an example of the pooling processing performed by the pooling layer shown in FIG. 6.

As illustrated in FIG. 8, the pooling layer reduces the size of the feature map, in other words, discards positional information, whereby comprehensive processing is enabled. However, the pooling layer separately stores position information, which is the positional information, for use by the decoder 31b.

In this way, the encoder 31a synthesizes pieces of local and low-order information by the convolution layer and the pooling layer, and can thus extract more comprehensive and high-order information. That is, the encoder 31a can sequentially convert the image data to be converted from pixel information to edge information, and then from the edge information to script information.

Figure 9:
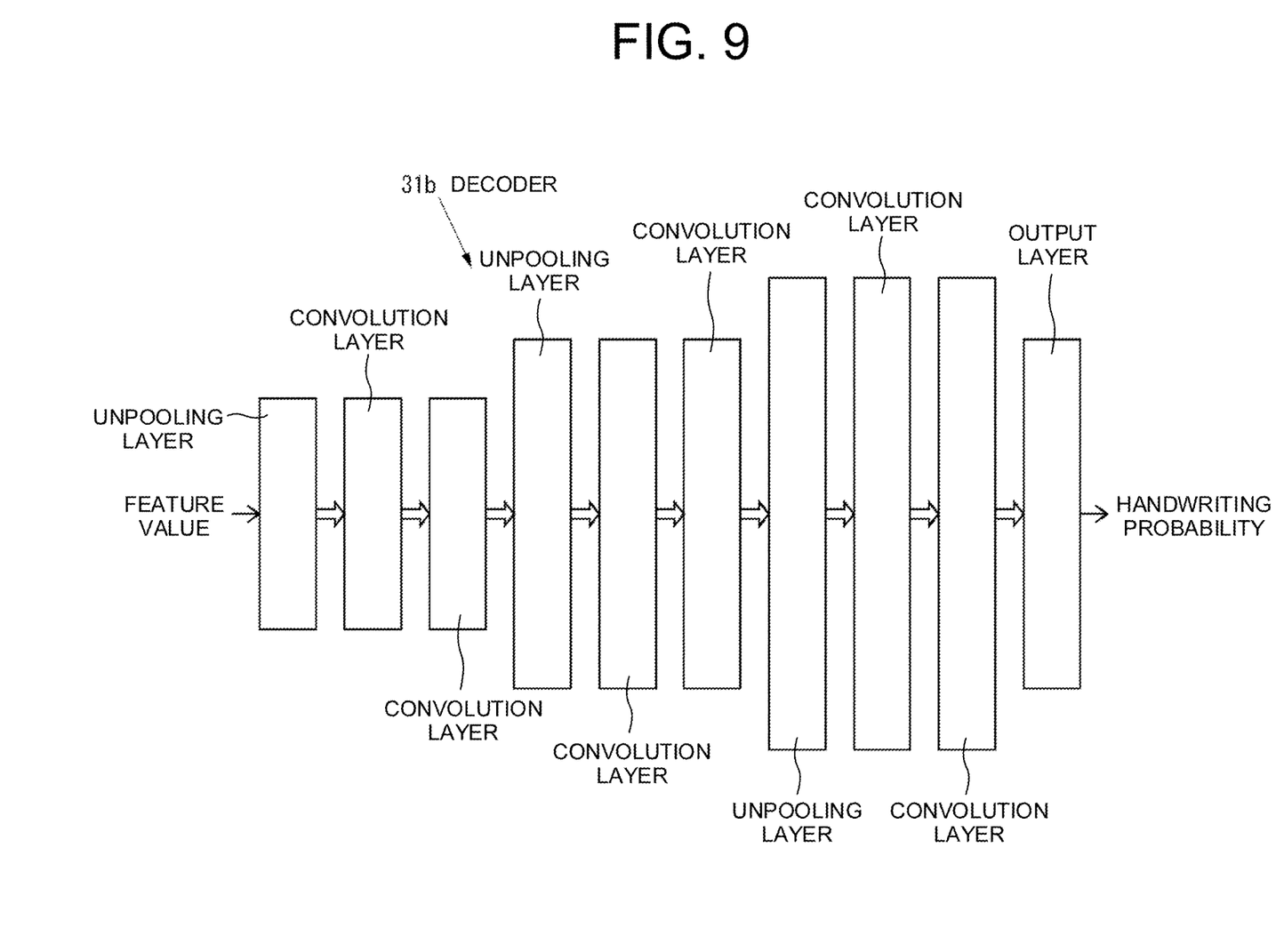
FIG. 9 is a diagram illustrating a flow of an operation of a decoder shown in FIG. 5.

FIG. 9 is a diagram illustrating a flow of an operation of the decoder 31b.

As illustrated in FIG. 9, the decoder 31b includes an unpooling layer, a convolution layer, and an output layer. The decoder 31b performs the processing of executing upsampling of handwriting feature values and using the unpooling layer and the convolution layer to specify the handwriting probability for each pixel of the image data.

The unpooling layer reproduces an accurate classification map by using the position information that has been stored in the pooling processing. The classification map corresponds to a map which stores the handwriting feature values. The convolution layer can perform conversion to derive pixel information having the handwriting feature value, and specify the handwriting feature value for each pixel of the image data.

The output layer normalizes the handwriting feature value for each pixel with a softmax function, and outputs a handwriting probability, which is a classification probability for a handwriting image. The handwriting probability is represented by a numerical value from 0 to 1.0.

By this feature, the decoder 31b can generate image area classification data. The image area classification data corresponds to data in which each pixel of the image data is labeled with the handwriting probability.

As described above, since the image forming apparatus 10 uses the CNN 31 to detect a handwritten part from an image, the handwritten part can be detected from the image with high accuracy. Also, since the image forming apparatus 10 omits the processing of the decoder 31b for an image of a blank sheet of paper, the handwritten part can be detected from the image at high speed. Consequently, the image forming apparatus 10 can detect the handwritten part from the image with high accuracy and at high speed.

The image forming apparatus 10 is configured to perform the processing in units of tile images. Thus, the smaller the size of the tile image is, the more the possibility of the tile image being the image of the blank sheet of paper is increased. Consequently, it becomes possible to increase the probability of omitting the processing of the decoder 31b, and the speed of detecting the handwritten part from the image can thereby be improved.

The image forming apparatus 10 determines whether the tile image corresponds to the image of the blank sheet of paper on the basis of the image whose size is compressed by the encoder 31a. Therefore, the speed of determining whether the tile image corresponds to the image of the blank sheet of paper can be increased, and the speed of detecting the handwritten part from the image can thereby be improved.

When the image forming apparatus 10 is to remove the handwritten part, the image forming apparatus 10 detects the handwritten part with the first threshold value 17b which is larger than the threshold value used in emphasizing the handwritten part. Therefore, the possibility that a part other than the handwritten part will be erroneously detected as being handwritten can be reduced. As a result, the possibility of erroneously removing the part other than the handwritten part can be reduced.

When the image forming apparatus 10 is to emphasize the handwritten part, the image forming apparatus 10 detects the handwritten part with the second threshold value 17c which is smaller than the threshold value used in removing the handwritten part. Therefore, the possibility that the handwritten part will be detected can be increased. As a result, the possibility that the handwritten part will not be emphasized can be reduced.

The image processing system of the present disclosure is configured from a single MFP in the present embodiment. However, the image processing system of the present disclosure may be configured from an image forming apparatus other than the MFP such as a copy dedicated machine, or may be an image processing system embodied by an apparatus other than the image forming apparatus such as a personal computer (PC). Further, the image processing system of the present disclosure may be realized by a plurality of apparatuses.

What is claimed is:

1. An image processing system comprising:
a convolutional neural network which determines, for each pixel of an image, a probability that the image represents handwriting; and
a segmentation image generation portion which generates a segmentation image based on a result of determination by the convolutional neural network, wherein
the convolutional neural network comprises:
an encoder which compresses information of the tile image for each tile image obtained by dividing the image into specific size pieces;
a decoder which restores the information of the tile image which has been compressed by the encoder; and
a specific image determination portion which determines whether the tile image corresponds to a specific image, and wherein
when the specific image determination portion determines that the tile image corresponds to the specific image, the segmentation image generation portion uses the specific image for an image of a part corresponding to the tile image in the segmentation image, and
when the specific image determination portion determines that the tile image does not correspond to the specific image, the segmentation image generation portion uses an output image of the decoder for an image of a part corresponding to the tile image in the segmentation image.

2. The image processing system according to claim 1, wherein the specific image determination portion determines whether the tile image corresponds to the specific image based on an output of the encoder.

3. The image processing system according to claim 1, further comprising:
a removal processing portion which generates an image in which a handwritten part is removed; and
an emphasis processing portion which generates an image in which the handwritten part is emphasized, wherein
the removal processing portion removes the image including a pixel, the probability of which is greater than or equal to a first threshold value, and
the emphasis processing portion emphasizes the image including a pixel, the probability of which is greater than or equal to a second threshold value, which is smaller than the first threshold value.

4. A non-transitory computer-readable recording medium having stored thereon an image processing program, the image processing program causing a computer to implement:
a convolutional neural network which determines, for each pixel of an image, a probability that the image represents handwriting; and
a segmentation image generation portion which generates a segmentation image based on a result of determination by the convolutional neural network, wherein
the convolutional neural network comprises:
an encoder which compresses information of the tile image for each tile image obtained by dividing the image into specific size pieces;
a decoder which restores the information of the tile image which has been compressed by the encoder; and
a specific image determination portion which determines whether the tile image corresponds to a specific image, and wherein
when the specific image determination portion determines that the tile image corresponds to the specific image, the segmentation image generation portion uses the specific image for an image of a part corresponding to the tile image in the segmentation image, and
when the specific image determination portion determines that the tile image does not correspond to the specific image, the segmentation image generation portion uses an output image of the decoder for an image of a part corresponding to the tile image in the segmentation image.

* * * * *